T. G. RENNERFELT.
SELF ADJUSTING BALL BEARING.
APPLICATION FILED JAN. 24, 1917.

1,246,321.

Patented Nov. 13, 1917.

Inventor
T. G. Rennerfelt, by
[signature]
Attorney

UNITED STATES PATENT OFFICE.

TURE GUSTAF RENNERFELT, OF KATRINEHOLM, SWEDEN, ASSIGNOR TO GRÖNKVISTS MEKANISKA VERKSTADS AKTIEBOLAG, OF KATRINEHOLM, SWEDEN.

SELF-ADJUSTING BALL-BEARING.

1,246,321.     Specification of Letters Patent.     Patented Nov. 13, 1917.

Original application filed April 10, 1912, Serial No. 689,890. Divided and this application filed January 24, 1917. Serial No. 144,247.

*To all whom it may concern:*

Be it known that I, TURE GUSTAF RENNERFELT, a subject of the King of Sweden, residing at Katrineholm, Sweden, have invented certain new and useful Improvements in Self-Adjusting Ball-Bearings; and I do hereby declare the following to be a full, clear, and exact description of the invention, such as will enable others skilled in the art to which it appertains to make and use the same.

This invention relates to ball bearings, and has for its object to obviate certain objections connected with ball bearings of the ordinary type and to render said bearings more efficient in action than has been heretofore possible.

With these and other objects in view the invention consists in the novel details of construction and combinations of parts more fully hereinafter disclosed and particularly pointed out in the claims.

This application is a division of my copending application Serial No. 689,890 filed April 10, 1912, entitled Improvements in ball bearings.

Referring to the accompanying drawings forming a part of this specification in which like numerals designate like parts in all the views—

Figure 1:
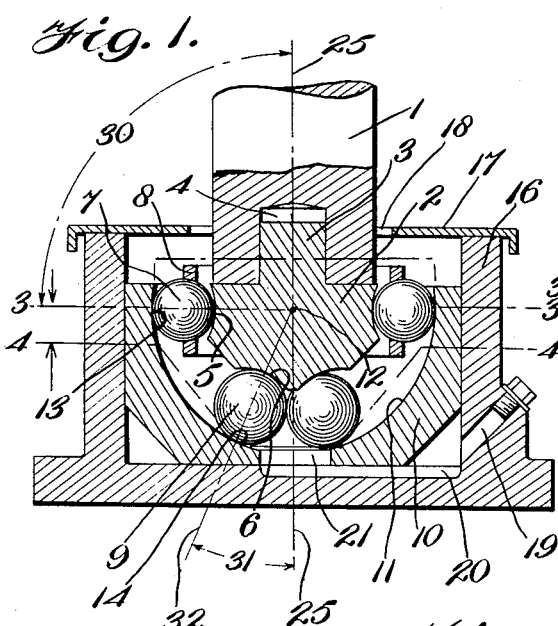
Figure 1 is diagrammatic sectional view of a bearing made in accordance with this invention.
Figure 2:
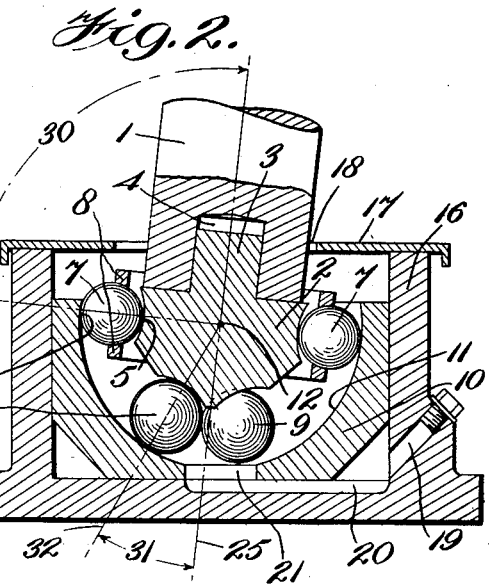
Fig. 2 is a view similar to Fig. 1 but showing the shaft slightly tilted.
Figure 3:
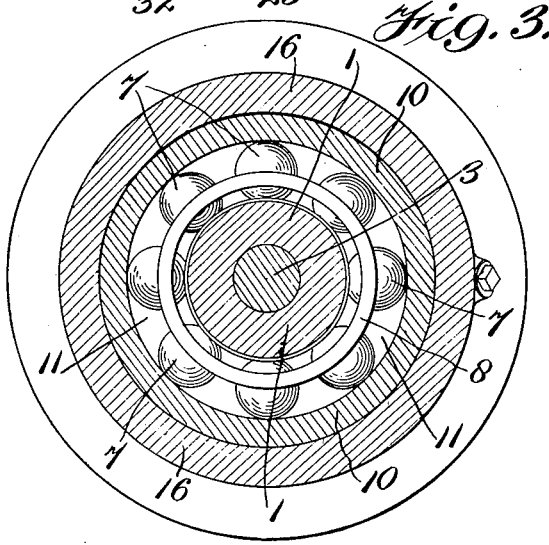
Fig. 3 is a sectional view on the line 3—3 of Fig. 1 looking in the direction of the downwardly pointing arrow.

1 indicates any suitable shaft which it is desired to support on balls, 2 any suitable end for the shaft 1, in this case illustrated as a separate piece provided with a tongue 3 entering a recess 4 in the shaft 1, but it is obvious that the member 2 may be formed rigid with the shaft if desired.

The said end 2 is provided with the curved ring like ball track 5, extending 360° around said end and is also provided with the curved ring like ball track 6 likewise extending 360° around the said end as shown. Located in the ball track 5 is the set of balls 7 conveniently held as by the cage or ring like member 8, and located in the ball track 6 is another set of balls 9.

Outside of the two ball sets 7 and 9 is located the pressure sustaining member 10 provided with an inner spherical surface 11 struck from the center 12, and made in one piece. The ball set 7 contacts with the said spherical surface 11, as at 13, and the ball set 9 contacts with said surface 11 as at 14, so that the said surface 11 provides two outer running faces 13 and 14 for the ball sets 7 and 9 and the said end member 2 likewise provides two inner running faces or grooves formed by the tracks 5 and 6, all as will be readily understood.

Outside of the pressure sustaining member 10 is the casing 16, preferably provided with a cover 17, having a hole such as 18 for the accommodation of the shaft 1. The said outer casing 16 may further be provided with oil channels 19 and 20 communicating with a hole 21 in the member 10, whereby a lubricant may be fed to the ball sets if desired.

As fully disclosed in my copending application No. 689,890 above mentioned, ball bearings prior to this invention have been generally constructed with an outer race ring having only one axis of symmetry, and it has therefore been found in practice that unless such a ball bearing was so mounted that its said axis of symmetry would coincide with the center line of the inner race, the bearing would give unsatisfactory service, because the balls contained therein would not always travel in true circles upon the face of the outer ring or pressure surface. In other words, in such cases the balls would tend to become unequally loaded and they would therefore sometimes jam or break.

As stated in said original application it was further found in practice very difficult to mount such bearings with the requisite degree of accuracy to avoid the above objections, and additional difficulties were also met when the ball bearings were used for sustaining both end pressures and lateral pressures from the same shaft. As a matter of fact prior to this invention it was frequently the custom to use separate bearings for these two kinds of pressure, and the two bearings thus employed were frequently mounted close together within one casing. But in this latter arrangement a small fault in the alinement of the axes of the bearings was found to cause considerable trouble.

The above objections were overcome as stated in said original application by locating the center point 12 of the spherical surface 11 nearer to a plane perpendicular to the axis of the shaft and passing through one ball set, than it is to a plane perpendicular to the axis of the shaft and passing through the other ball set.

The result of this construction is to provide tracks for the ball sets of different diameters when measured from the rotative axis of the shaft and in most cases to provide balls of different diameters in the two ball sets.

Stated in still other language, as is well illustrated in the present drawings, the grooves or tracks 5 and 6 on the shaft 1 have different diameters in that they are located different distances from the rotative axis 25 of the shaft, that is they have unequal radii when measured in the planes of said tracks from said axis 25—25.

An additional condition that is essential to commercial success in overcoming the above objections is that the spherical surface 11 shall be produced from a single piece of metal, so that the tracks 13, and 14 on said surface 11 shall be absolutely unbroken.

A still further condition to commercial success is, as stated above, that the center point 12 from which said surface is struck shall not only be nearer the plane of one ball set than it is to the plane of the other ball set, but that it shall also be located on the rotative axis 25—25 of the shaft.

It will now be clear that if we draw a line 3—3 passing through one of the balls 7 and the center point or point of oscillation 12, it will represent a line of pressure on the said ball 7 and it will make an angle 30 with the rotative axis 25. In the same way if we draw a line 32 through one of the balls 9 and the said oscillating center 12 it will represent a line of pressure on the said ball 9 and will make an angle 31 with the said rotative axis 25.

It will further be observed that the angles 30 and 31 will be unequal as indicated. It therefore results from this construction that the angles 30 and 31 being of different dimensions, the respective ball sets will resist unequal pressures along radial lines passing through the individual balls and said oscillating center 12. It will further be evident that as the outer surface 11 contacts with said ball sets, and has its center of curvature of its bearing surfaces or tracks 13 and 14 located on the rotative axis 25 it will be apparent that the bearing is capable of a tilting movement around the oscillating center 12 to bring the balls outside of the outer member 10, and also that this rotative movement renders the bearing self-adjusting or self-alining.

From the drawings it will be apparent that a lateral force acting in the direction of the line 3—12 upon the end of the shaft 1, will be resisted by a pressure on three out of eight of the balls 7, constituting the upper ball set, and that this said pressure will form an angle of substantially 90° with the rotative axis 25 of the shaft 1. It will further be clear that an end thrust on the shaft 1 will also be sustained by three balls of the ball set 9.

In other words, it will be clear from the drawings that the pressure acting on one of said balls 9 is only say about ten per cent. greater than the useful axial component of said pressure, as will be clear from a comparison of the lines 6 and 26 which form the angle 31.

In the modified form of construction shown in Fig. 5 the angle 40 which corresponds to the angle 30 in Fig. 1 is 90°, while the other angle which would correspond to the angle 31 in Fig. 1 becomes 0. In such case the entire end thrust on the shaft is sustained by the single ball 41 located in the center line 25 of the shaft 1.

The end member 2 of the shaft as well as the outer member 10 of the bearing is preferably made of hardened steel, and the race rings such as 5 and 6 are accurately ground to the required shape. The outer spherical surface 11 is further accurately ground to shape and its larger opening is ample to permit the entrance of suitable grinding tools, so that the said member 10 and surface 11 may be readily constructed from a single piece of metal, thus affording unbroken ball tracks 13 and 14.

It will be observed that the construction herein illustrated is especially adapted for vertical shafts such as those used for cranes, derricks, etc., and that in such cases it is not generally necessary for the lower end 2 of the shaft to pass entirely through the bearing or member 10. Accordingly, in the drawings the end 2 of the shaft terminates in the hemispherical bearing member 10, and rests upon one or more balls of the lower ball set.

It will now be clear that this invention provides a combined thrust and radial bearing comprising the inner bearing member 2, provided with the pair of unbroken grooves or tracks, and 5 and 6, having unequal radii from the axis of the bearing, a ball set 7 and 9 mounted on each track; and that this said bearing also comprises an outer pressure sustaining member 10 having a pair of hollow spherical unbroken tracks 13 and 14 for said ball sets, that said tracks 13 and 14 are struck from an oscillating center point 12 positioned on the axis of rotation of the shaft, and nearer the plane of one ball set than it is to the plane of the other ball set.

Figure 4:
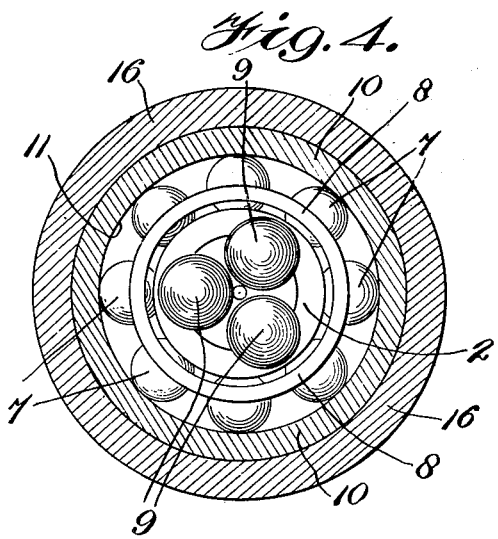
Fig. 4 is a sectional view on the line 4—4 of Fig. 1, looking in the direction of the upwardly pointing arrow.

It will also be clear that in order to enable the track 6 to sustain substantially all the load of the shaft 1, said track is located in the extreme end surface of said shaft or of the end piece 2 and is preferably chosen of such a radius as to accommodate three balls 9, as shown in Fig. 4, which in turn transmit said load to the hollow member 10 constituting a hemisphere inside which the extreme end of said piece 2 is located.

It will further be observed that this said bearing permits of the inner member 2, as well as of the ball sets 7 and 9 being tilted around the said oscillating center 12 in order to bring the balls outside of the pressure member 10 and also to enable the bearing to be self-alining or self-centering.

It now will further be clear that if the balls are made with sufficient accuracy that the danger of unequally overloading the same is reduced to a minimum, and that if the parts are properly ground and made from hardened steel, the bearing will be exceedingly efficient in use.

It is obvious that those skilled in the art may vary the details of construction, as well as the arrangement of parts without departing from the spirit of the invention and therefore it is not wished to limit this invention to the above disclosure except as may be required by the claims.

What is claimed is:

1. In a combined thrust and radial bearing the combination of an inner bearing member having two grooves forming unbroken tracks of unequal radius from the axis of rotation of said bearing member, the smallest of said tracks being located on the extreme end surface of said bearing member; a ball set mounted on each track; and a hollow member constituting a hemisphere inside which the extreme end of said inner member terminates and having spherical unbroken tracks for said balls struck from a center point positioned on said axis nearer the plane of one ball set than of the other; the said inner member and ball sets being capable of a tilting movement around the said center point to bring the balls outside of the outer member, substantially as described.

2. In a combined thrust and radial bearing the combination of an inner bearing member having two grooves forming unbroken and integrally connected tracks of unequal radius from the axis of rotation of the bearing; one of said tracks being located on the extreme end of said bearing member; a ball set mounted on each track; and a hollow outer member constituting a hemisphere in which said inner member terminates and having spherical unbroken and integrally connected tracks for said balls struck from a center point positioned on the said axis within the bearing and nearer the plane of one ball set than to the plane of the other, the said inner member and balls being capable of a tilting movement around said center point to bring the balls outside the outer member, substantially as described.

3. In a ball bearing the combination of an inner bearing member provided with a pair of circular concave running faces struck from centers on the rotative axis of said member and having unequal radii from said axis, the track having the lesser radius being located on the extreme end of said inner bearing member; a pair of ball sets located on said faces; and an integral, concave, outer spherical pressure member inside which said inner member terminates and having a running face with which said ball sets contact, struck from a point also located on said axis but nearer to the center of the larger running face, than to that of the smaller running face, whereby the respective ball sets may resist predetermined unequal pressures along radial lines passing through said point and said circular running faces.

4. In a ball bearing the combination of a shaft provided with a detachable end forming an inner bearing member provided with a pair of concave, circular, unbroken tracks struck with unequal radii from centers located on the axis of rotation of said member, the smaller track being located on the extreme end of said inner bearing member; a ball set located on each of said tracks; and an outer bearing member having a concave, integral, spherical running face with which said ball sets contact, and inside which said extreme end is located, said face struck from an oscillating center also, located on said axis, but nearer the center of the running face having the greater radius than to that of the running face having the smaller radius, whereby said ball sets may resist unequal predetermined pressures along lines passing through each track and said oscillating center, and whereby said inner member and ball sets will be capable of a tilting movement around said oscillating center.

5. In a ball bearing the combination of a vertically disposed shaft; a detachable end member constituting an inner bearing member associated with said shaft, said inner bearing member provided with a pair of bearing surfaces; one of which is located on the extreme end of said inner bearing member; balls associated with said surfaces; and an outer bearing member in which said inner bearing member terminates comprising an integral hollow hemispherical surface struck from an oscillating center located on the rotative axis of said outer member and providing outer bearing surfaces for said balls, the parts being so arranged that the inner member and balls may be rotated around said oscillating center to bring the balls outside of said outer member, substantially as described.

In testimony whereof I affix my signature in presence of two witnesses.

TURE GUSTAF RENNERFELT.

Witnesses:
E. M. MANNSCOCAL,
ROB ANDERSSON.